United States Patent [19]

Pisani et al.

[11] 4,302,755

[45] Nov. 24, 1981

[54] VISUAL DISPLAY UNIT AND DISPLAY METHOD FOR A PROGRAMMABLE COMPUTER

[75] Inventors: Federico Pisani, Scarmagno; Alessandro Graciotti, Ivrea, both of Italy

[73] Assignee: Ing. C. Olivetti & C., S.p.A., Italy

[21] Appl. No.: 77,198

[22] Filed: Sep. 20, 1979

[30] Foreign Application Priority Data

Sep. 20, 1978 [IT] Italy ............................ 69167 A/78

[51] Int. Cl.[3] ............................................ G06F 3/153

[52] U.S. Cl. .................................. 340/734; 340/721; 340/722

[58] Field of Search .................... 315/377; 324/121 R; 340/709, 721, 722, 734, 747

[56] References Cited

U.S. PATENT DOCUMENTS

| | | | |
|---|---|---|---|
| 2,901,664 | 8/1959 | Firmenich | 340/734 X |
| 3,249,796 | 5/1966 | Moffitt | 315/377 |
| 3,577,031 | 5/1971 | McCormick et al. | 340/734 X |
| 3,662,373 | 5/1972 | Schumann | 340/709 |
| 3,725,901 | 4/1973 | Lehari et al. | 340/722 |
| 3,739,347 | 6/1973 | Forsberg | 340/709 |
| 3,859,556 | 1/1975 | Schumann | 315/377 X |
| 3,872,461 | 3/1975 | Jarosik et al. | 340/721 X |
| 4,092,567 | 5/1978 | Sharrit | 315/377 |

*Primary Examiner*—David L. Trafton

*Attorney, Agent, or Firm*—Schuyler, Banner, Birch, McKie & Beckett

[57] ABSTRACT

In a cathode ray video display unit which is designed to display graphical and alphanumeric images, the marker is made up by two orthogonal cartesian axes XAX, YAX which can be positioned by the operator or by the program. The axes have the same luminosity as the lines of the displayed image. The points of intersection P1–P5 of the axes of the marker with the portrayed lines are caused to stand out with increased brightness for the purpose of making their relative position more evident on the video unit. The coordinates of the points which stand out (X1, Y1 etc) and those of the origin of the axes (X0, Y0) may be reproduced in the form of an alphanumeric message on part of the screen. The increased brightness is commanded by a signal formed as the AND function of the signal commanding the graphical display and a marker signal which is generated at a predetermined point in every line scan and throughout the whole of one selected line scan.

9 Claims, 5 Drawing Figures

VISUAL DISPLAY UNIT AND DISPLAY METHOD FOR A PROGRAMMABLE COMPUTER

The present invention relates to a visual display unit (VDU) for displaying graphical images, for a programmable computer, and comprising a display screen and a control unit. The invention also relates to a display method.

Various VDU's are known in the art. They are generally used in conjunction with data processing equipment to provide a visible display of the results corresponding to the various processing operations carried out: messages, questions, or diagrams and graphs which are representative of the desired results. In known VDUs, use is generally made of a luminous indicator, in order to select visibly particular points of the displayed image. This luminous indicator (referred to as a cursor or marker and as a marker in what follows) can be positioned manually using particular keys or automatically by the program being processed by the computer. It is desirable that the marker, when it is used in conjunction with graphical images, can be clearly seen and can indentify accurately the position of any point whatsoever of a graphical representation with ease. The marker, when used with display devices for graphical images, generally consists of a small cross, which may flash, so that the portions of the display are not confused with the marker itself. This type of marker often has disadvantages resulting from poor visibility, especially when it is necessary to mark an exact position on lines of the displayed drawing. This degree of accuracy is indispensable when it is desired to centre on particular geometrical points (e.g. intersections of lines, maximum and minimum points etc.) in order to obtain their coordinates.

A second important consideration, particularly when the VDU is providing images relating to real time processing, is that of being able to update the screen in a rapid and efficaceous manner using simple and inexpensive means.

The main object of the invention is to provide for the distinguishing of the points of particular interest on the screen using a clearly visible marker, which is precise and easy to use by the operator. This object is met by the invention as defined most broadly in claim 8 and more specifically in claim 1.

In the preferred embodiment, the marker is a pair of orthogonal axes (which can be positioned using the program or suitable keys) and the points of intersection of each one of these axes with a line of the graphical image are found by the control unit which then reinforces the luminosity of them.

The lines which make up the axes are continuous and have the same luminosity as the lines of the image displayed. The point which is located by the marker on the screen is the origin of the axes.

The operator is consequently greatly helped when determining distances or carrying out other types of technical examination of graphical displays, statistics or similar reapresentations displayed on the screen.

The position of the axes with respect to the image is thus made to stand out using the bright point of intersection. Positioning of the axes of the marker on to a determined point of the image is facilitated since it is sufficient to observe the exact super-positioning of the luminous points on the regions with which one is dealing. A subsidiary feature of the invention relates to a simple and inexpensive way of immediately updating the image and/or alphanumeric text at the very moment at which new information from the processor is available. This is achieved by providing a memory on which the information relating to the image to be displayed is recorded (the information concerning both the graphical image and the alphanumeric texts) and by providing an alternating access system: a read access, in order to extract information relating to the image, alternating with a write access by the processor, in order to update any particular item in the memory.

The sequence of these accesses is synchronized in a simple manner using the timing which commands scanning on the screen, and using this, continuous (almost real time) updating of the image is obtained using only a small number of electrical circuits.

Another subsidiary feature of the invention provides in a cathode ray video unit, correct timing of the horizontal and vertical scanning, taking advantage of the outputs from memories of the ROM type addressed by counters. Using such a circuit obviates the need to design complex systems for synchronisation.

A preferred embodiment of the visual display unit according to the invention will now be described by way of example, with reference to the accompanying drawings in which.

Figure 1:
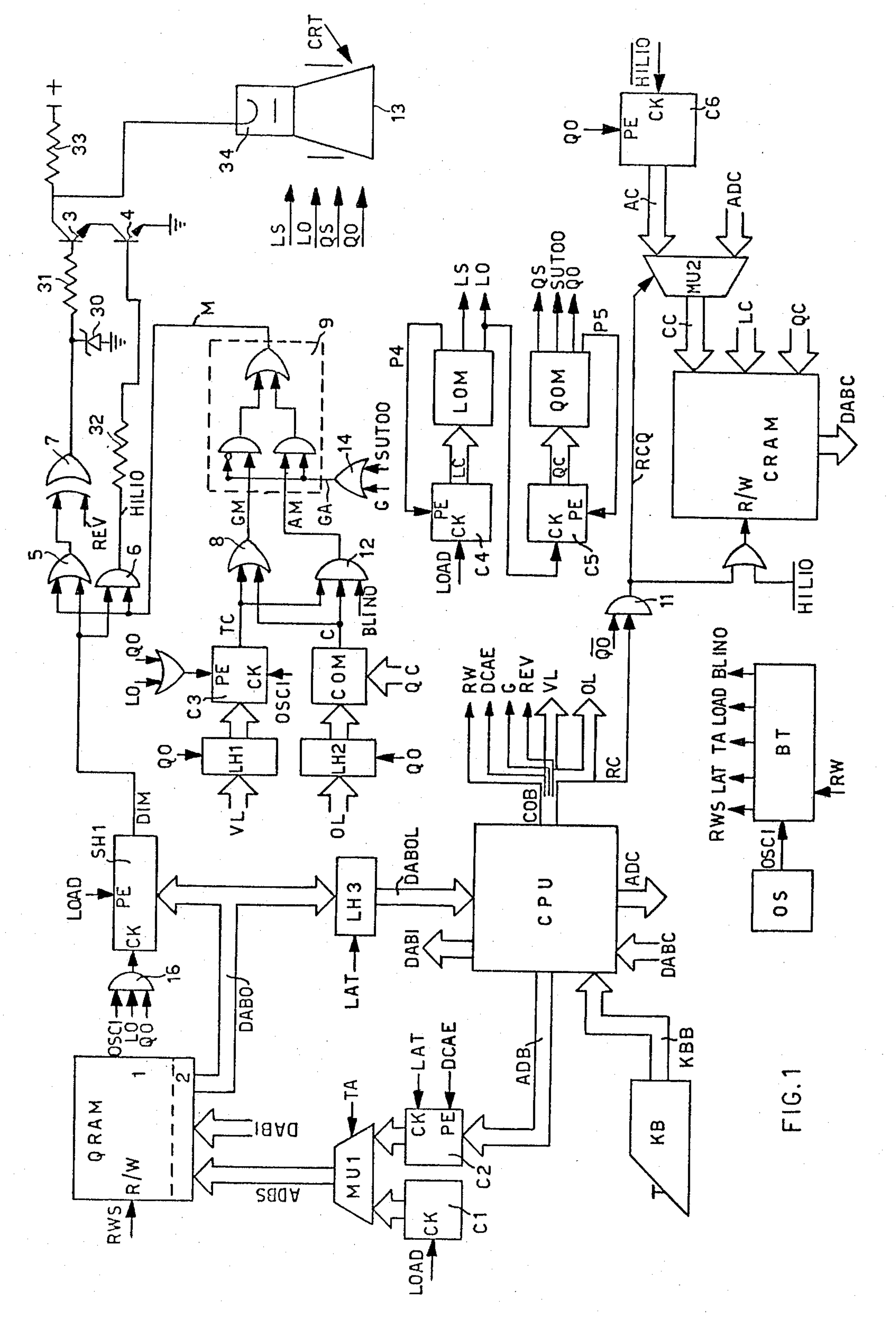
FIG. 1 is a block schematic diagram of the VDU.

The circuit shown in FIG. 1 essentially comprises a read and write memory Q RAM which stores the information necessary for displaying the current image (alphanumeric and/or graphical) on the video unit, a central processing unit CPU having its own memory and being capable of operating as a data source for the memory Q RAM (via address and data buses ADB and DABI) and which can receive commands and data from a keyboard KB and can send commands to the remaining devices of the VDU using a command bus COB. A timing circuit BT which driven by an oscillator OS, times the operation of the component circuits of the VDU. Display is effected on a cathode ray tube (CRT). This choice of components is provided solely by way of example. A number of circuits and electronic components connected to the elements described above are also used, and the function of these will be described in detail below.

Figure 2:
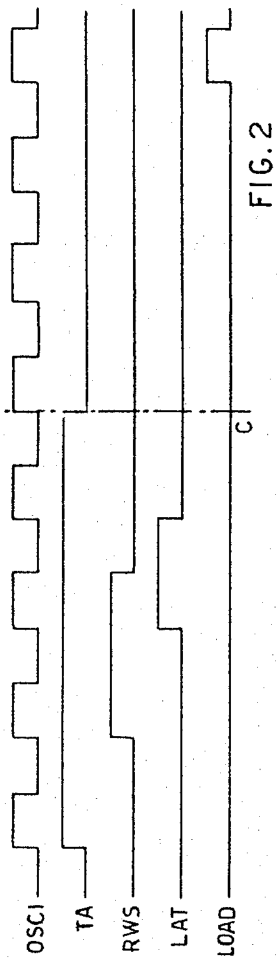
FIG. 2 shows some of the timing signals relating to operation of the VDU.

The operation of the arrangement will now be considered with reference also to the timing signals shown in FIG. 2. Memory Q RAM stores information which is representative of the lines of graphical representations or of characters. It is divided into a first part 1 for holding information in order to display a graphical and alphanumeric image on the upper part of the CRT screen (see also FIG. 5) and a second part 2 which holds the information for displaying data and alphanumeric messages on the lower part of the video CRT screen. Obviously the manner in which memory Q RAM is partitioned and the division of the resulting image is given purely by way of example, since it depends soley on the way in which the CPU transfers the various items of information to it.

The access to the memory Q RAM is granted alternately to the processor CPU (for carrying out updating with the writing of new words or with the reading of the image which is currently being displayed) and to the CRT in order to obtain the information necessary for providing display from it. In the timing signals shown in FIG. 2 the vertical line C separates the period of access dedicated to the CPU (to the left of the line) from the period of access dedicated to the CRT (to the right of the line). Signal TA delivered by the timing circuit BT to a multiplexer MU1 selectively connects, depending on whether the access cycle relates to the CPU or to the CRT, counter C2 or counter C1 respectively with the bus ADBS which addresses the memory Q RAM.

Counters C1 and C2 are clocked by signals LOAD and LAT respectively generated by the timing circuit BT. Furthermore, the processor CPU can preset the counter C2 by sending a presetting word on bus ADB and by activating a signal DCAE.

When the access cycle to the memory concerns the CPU (TA at the high level) the CPU can carry out a read cycle or a write cycle, based on the address held in C2. In order to carry out a write cycle, the CPU activates signal RW and provides it as an input to the timing circuit BT, which, correspondingly, activates a signal RWS and provides it as an input to the memory Q RAM. The data is sent to memory Q RAM via bus DABI by the CPU.

In the alternative case of a read cycle, signals RW and RWS remain at the low logic level, whilst the signal LAT, which is an input to a register referred to as latch LH3, stores the information read at the correct time, this being provided by memory Q RAM on output bus DABO. The information is consequently available to the processor on bus DABOL.

When the access cycle to the memory is assigned to the CRT, (TA at the low level), the information is read exclusively (based on the address held in counter C1) and is sent by means of bus DABO, to a shift register SH1. The shift register SH1 is enabled to receive data the appropriate moment by means of a signal LOAD which is generated by the timing circuit BT.

Signal OSCI, which is directly generated by the oscillator OS commands, via AND gate 16, the shifting of the shift register SH1 so as to transform the information taken from the memory Q RAM into a sequence of binary signals, DIM. The AND gate 16 is controlled by a line flyback signal LO and by a frame flyback signal QO, which are described below, in order to inhibit generation of binary signals DIM when the CRT beam is not enabled to carry out tracing of the image on the screen.

The binary signals DIM pass via an OR gate 5 and an EX-OR gate 7 and an amplifier made up by transistors 3 and 4, diode 30 and resistors 31, 32 and 33, to control the cathode 34 of the CRT in order to selectively generate luminous regions on the screen 13. Processor CPU, by activating a signal REV supplied as an input to EX-OR gate 7, can invert all the command signals originating from OR gate 5 so as to thus present a negative image on the screen. In other words, signal REV transforms light images on a dark background into dark images on a light background.

The second input of OR gate 5 is a signal M which generates the marker on the screen 13, and in the present embodiment this is made up by two orthogonal straight lines, one vertical and one horizontal, which can be positioned with their intersection at any point whatsoever on the screen 13. The logic providing for positioning or display of the marker will now be described. Apart from the known use of introducing characters and commands into processor CPU, the keyboard KB is also used to allow the operator to introduce the data relating to the positioning of the two axes which make up the graphical marker into the CPU. This data may readily be introduced in the form of numbers which represent an absolute position on the screen or in the form of displacements (which are given in fairly fine increments and are provided in the various directions, namely left, right, upwards and downwards, and which are commanded by various keys, which are not shown in the drawing.

In its turn, the CPU provides two pieces of data as an output which unequivocally relate to the position of two axes: on bus VL for the vertical axis and on bus OL for the horizontal axis. Clearly, depending on the form of the data originating from the keyboard KB (these being commands for one elementary displacement or more, final positions which the axes are to reach etc.) the processor CPU must carry out programmes which are more or less complex in order to generate the data VL and OL.

Further explanation of these programmes will not be provided for the sake of simplicity of description, since they will be known to those skilled in the art.

Alternatively, the current programmes of the CPU, acting without intervention of the operator, may generate the data VL and OL in order to position the marker at predetermined points. When a fresh position of the marker is called for, latches LH1 and LH2 memorise, at the instant indicated by the signal QO, the two fresh pieces of data, which are respectively present on buses VL and OL.

The frame flyback signal QO is provided by a memory QOM as will be explained below, each time the cathode beam has finished the scanning of one frame and must return to the start in order to perform the following frame.

A counter C3 is pre-loaded at signal QO with the number stored in latch LH1 at each frame flyback and at each line flyback (signalled by the signal LO, which is described below). The counter C3 is decremented by the signal OSCI. In each line scan, the counter C3 counts down starting from the pre-loaded number and activates, correspondingly, a signal TC for end of counting.

Signal TC, via an OR gate 8 and an AND-OR logic 9, generates the signal M, which as has already been mentioned, is delivered as an input to the OR gate 5.

The use of the OR gate 5 determines, on the screen 13, the superinposing on the image commanded by the signals DIM of the lines which make up the marker. It is important to observe that the number with which the counter C3 is pre-loaded at the start of scanning of each line remains constant during the scanning of one frame; the signal M thus generates luminous signals at the same position in each line and which are consequently prefectly aligned vertically. The vertical axis of the marker is obtained in this way.

For design reasons, the horizontal axis is obtained more simply by directly comparing (by means of a comparator COM) the piece of data OL (stored in latch LH2) and representative of the desired position, with the piece of data present on a bus QC which, as will be explained, represents the line which is currently being scanned by the beam. Consequently, a signal C at the output from the comparator is activated for the whole duration of the scanning of the line concerned. Signal C is sent to the second input of OR gate 8; consequently signal M is also activated for tracing the horizontal axis on the screen 13. The combined presence at the inputs of an AND gate 6 of signal M, which commands display of the marker, and signals DIM which commands display of the image on the screen 13 of the CRT, activates a signal HILIO. Signal HILIO, when activated, causes transistor 4 to conduct and in this way increases the amplification of the signal which is contemporaneously present at the base of the transistor 3. The effect of this is to cause the CRT beam at the intersections of the lines of the marker with the lines forming part of the image, to produce a dot, the luminous intensity of which is greater than the other luminous dots which form part of the graphical image or the orthogonal axes on the screen. These points of intersection are consequently clearly displayed on the screen as is indicated by dots P1 to P5 in FIG. 5.

Obviously, the principle of carrying out luminous reinforcement of the point of intersection of two lines on a screen is completely general. In the case with which we are dealing this is applied to a marker which is made up by two orthogonal axes, but the same principle can in a very similar manner be applied to any type of interesection whatsoever with which one is dealing, e.g. with markers having a different form or which are flashing or with reference lines or cures which it is desired to display.

A signal GA supplied as an input to the AND-OR logic 9 selectively enables passage of the signal GM (graphical marker) or a signal AM (alphanumeric marker). The signal AM is provided by the AND of signals TC and C which command display of the two axes; the signal AM is therefore only activated at the intersection of the axes and displays only one single point on the screen 13, in the position indicated by numbers VL and OL. Signal BLINO, originating from timebase BT, enables an AND gate 12 intermittently so that the alphanumeric marker is a flashing marker.

A signal SUTOO included in the synchronising signals is rendered active at the start of the zone 2 of the memory Q RAM. This means that, in this embodiment, the lower part of the CRT screen is reserved for alphanumeric symbols. The signal SUTOO, by way of an OR gate 14, disables the marker signal GM, thereby inhibiting display of the graphical marker in the lower zone of the screen; passage of the signal AM through the circuit 9 is enabled to generate the alphanumeric marker.

Figure 4:
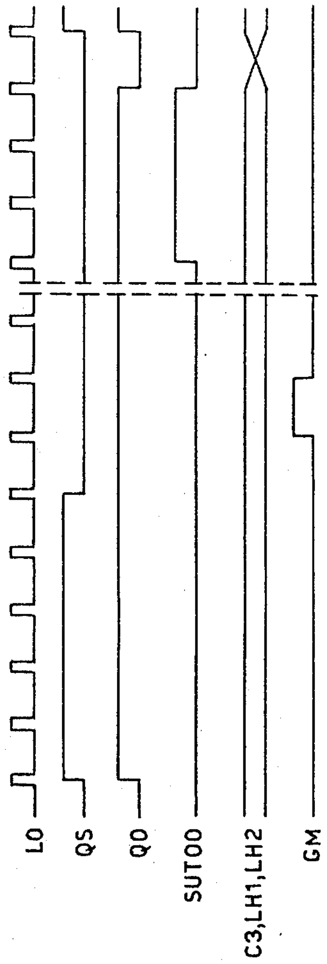
FIG. 4 shows some timing signals relating to frame synchronisation of the CRT of the VDU.
Figure 3:
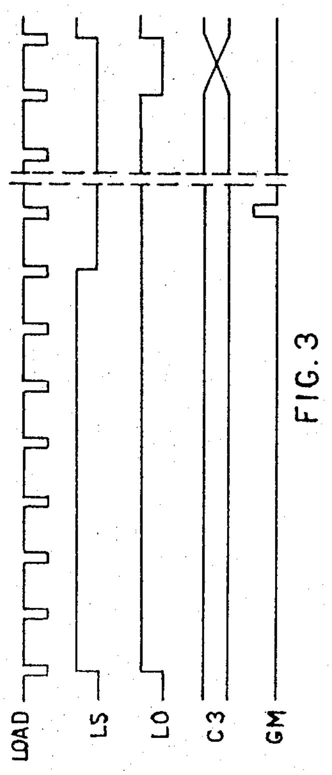
FIG. 3 shows some timing signals relating to line synchronisation of the CRT of the VDU.

The timing diagrams of FIGS. 3 and 4 show the generation of the signal GM in relation to the line and frame synochronising signals. In FIG. 3, the signal GM corresponds to the end of count signal of the counter C3, being active at a certain point in each horizontal line scan. In FIG. 4, the signal GM copies the output of the comparator COM, being active for the whole duration of the selected line scan.

When exclusively alphanumerics are employed over the whole screen 13, the CPU provides a signal G to the OR gate 14 so as to force the signal GA to the high logic level during the whole of the scanning of the screen. In this case, the space 2 occupies the whole memory Q RAM. The way in which the screen has been divided in the present embodiment is only given by way of example. The alphanumeric marker generated by signal AM is in general provided using several luminous dots.

Activation of the signal SUTOO, which reserves the lower region of the screen 13 for alphanumeric messages may be programmed for any point of the screen whatsoever. Equally, the signal SUTOO may never by activated; the axes of the marker then take up the dimensions of the whole screen 13 and the whole of the screen can be dedicated to graphical images (although with the relative alphanumeric characters). In this case the zone 1 occupies the whole area of the memory Q RAM. In both cases the circuits for generating the marker will continue to ensure the presence of a dot or a pair of axes having luminous points of intersection, depending on the particular case.

The circuit comprising counters C4 and C5 and read only memories LOM and QOM generate all the signals are shown in the timing signals provided in FIGS. 3 and 4.

Those skilled in the art will be familiar with the function of the various signals and with how these can be used to control scanning of a VDU of the type which has been chosen for this embodiment. We will however provide a list of the signals and their respective functions: LS line synchronization; LO line flyback; QS frame synchronization; QO frame flyback. SUTOO is activated for reasons explained above in correspondance with the lower region of screen 13, which is reserved for alphanumeric messages. Signal LOAD (FIG. 3), which is generated by the timing circuit BT, increments the counter C4. With each step of the counter C4, the address LC entering memory LOM is incremented. The words which are successively addressed in memory LOM, generate output signals P4, LS, LO. It suffices to suitably programme the memory in order to obtain, successively, high and low logic levels of the various signals.

With reference to the timing signals shown in FIG. 3, at the start of scanning of one line, signal P4 (not shown), which has been activated at the end of the previous line, resets counter C4. The first word which is generated as an output as a result of the first impulse LOAD is of the type 1, 1 (signals LS and LO at the high logic level). This same arrangement is maintained for the first 7 words stored in memory LOM. The eighth impulse of LOAD addresses a word of the type 0, 1 as a result of which signal LS undergoes a transition whilst LO remains at the high logic level. The programming of memory LOM will not be described in more detail as this would be superflous and any person skilled in the art could carry it out in such a way as to obtain the timing shown in FIG. 3, and even more complex timing signals, comprising signals of a differing type. In a completely analogous manner, the timing shown in FIG. 4 can be obtained escept that counter C5 is incremented with each line scanned by line flyback signal LO.

The circuit comprising counter C6, multiplexer MU2 and a memory CRAM of the read and write type, stores (and then makes available to the CPU) the coordinates of the various points of intersection between the axes of the marker and the lines of the image (i.e. the points having reinforced luminosity). Counter C6 is reset before starting scanning of a fresh frame by signal QO. Signal $\overline{\text{HILIO}}$ increments the counter C6 on each occasion when, during scanning of the frame, points having reinforced luminosity are described. Signal RCQ when it is at the low logic level enables memory CRAM to carry out writing and connects, via multiplexer MU2, bus AC to bus CC, so that memory CRAM is subsequently addressed by counter C6. Correspondingly, buses LC and QC leaving counters C4 and C5 carry data which relates respectively to the position of the cathode ray beam on the line and to the position of the line which is currently being scanned in the frame. Such data is recorded in pairs for each space addressed in the memory CRAM. Signal RCQ is caused to take up the low logic level by the signal QC (by means of AND gate 11) when frame flyback is not occuring.

During frame flyback, signal QO is at the high logic level. This makes it possible for the processor CPU to enable the memory CRAM by means of the signal RC which renders the signal RCQ high to carry out a read function and to address CRAM by means of bus ADC in order to have access to the data, or in other words to the coordinates of the points concerned. This data is transferred to the processor CPU by means of a bus DABC.

At this point it should be stressed that the coordinates of the point of intersection between the axes are already held in the processor CPU. Consequently the processor is able, using simple routines which are very well known in the art, to generate suitable messages and to send the corresponding data to memory QRAM in order to be able to display digitally the coordinates which are concerned on the three last lines of the screen 13.

Figure 5:
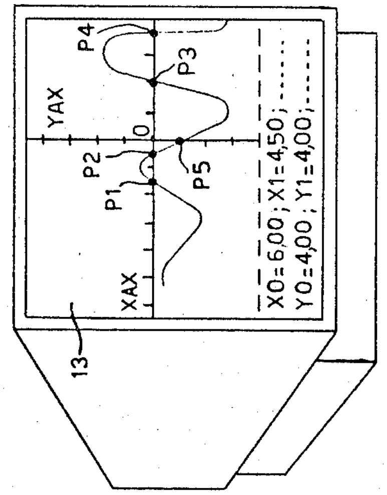
FIG. 5 shows the screen with a graphical and alphanumeric image on which the use of the marker is clearly shown.

FIG. 5 is a diagrammatical view of the VDU display and draws attention to the fact that the points of intersection P1–P5 have been caused to stand out and that their coordinates are displayed together with those of the origina of the axes (XO, YO) at the lower portion of the screen.

We claim:

1. A visual display unit for displaying graphical images, comprising a display screen and a control unit for controlling the screen in order to display a marker formed by a pair of orthogonal axes whose point of mutual intersection can be positioned at selected points on the screen, characterized by means for causing the display of the points of intersection of the marker axes with the lines which make up the graphical image, with a luminous intensity which is greater than the luminous intensity of the remaining points displayed, further characterized in that the screen comprises a general region for displaying graphical images and alphanumeric characters and an alphanumeric region, and in that the control unit comprises means for displaying in the general region the graphical image, the marker axes and the said points of intersection, and for displaying in the alphanumeric region the coordinates of the points of intersection of the marker axes with the graphical image and the point of intersection of the marker axes.

2. A visual display unit for displaying graphical images, comprising a display screen and a control unit for controlling the screen in order to display a marker formed by a pair of orthogonal axes whose point of mutual intersection can be positioned at selected points on the screen, characterized by means for causing the display of the points of intersection of the marker axes with the lines which make up the graphical image, with a luminous intensity which is greater than the luminous intensity of the remaining points displayed, further characterized in that the control unit includes a circuit for detecting the simultaneous presence of a signal commanding the graphical display and of a signal commanding display of the marker axes, and for correspondingly increasing the display brightness, further comprising a keyboard for introducing data and commands into the control units, characterized in that the control unit includes a circuit for sequentially generating electrical signals for selectively illuminating the points on the screen which make up the graphical image and a circuit which is commanded by the control signals generated by the keyboard for displaying the orthogonal axes, the said detecting circuit being commanded jointly by the said electrical signals and by the said circuit for displaying the axes.

3. A visual display unit for displaying alphanumerical and graphical images, comprising a display screen and a control unit for controlling the screen in order to display a marker formed by a pair of orthogonal axes whose point of mutual intersection can be positioned at selected points on the screen, characterized by means for causing the display of the points of intersection of the marker axes with the lines which make up the graphical image, with a luminous intensity which is greater than the luminous intensity of the remaining points displayed, the control unit including a memory for storing information relating to the image to be displayed, the unit also including a programmable processor for exchanging data and commands with the control unit, and a keyboard for introducing data and commands into the processor, characterised in that the pair of orthogonal axes can be positioned by means of the keyboard and/or the processor and in that the control unit generates a sequence of first electrical signals using the information taken from the memory, generates selectively first luminous signals on the screen corresponding to the first electrical signals for displaying the graphical image; generating a sequence of second electrical signals corresponding to information introduced into the control unit from the processor and/or the keyboard, generates selectively second luminous signals corresponding to the second electrical signals for displaying the orthogonal axes, detects for each point on the screen, the simultaneous presence of the first and second electrical signals and generates, in correspondence, a third electrical signal, and generates a luminous signal having an intensity which is greater than that of the first and second luminous signals in response to the third electrical signal.

4. A visual display for displaying graphical images, comprising a CRT display screen having a cathode, signal amplifying means for controlling said cathode, said amplifying means comprising first and second amplifying circuits so mutually connected as to sum up their effects on said cathode, a memory for storing information of individual points of the image to be displayed, reading means sequentially reading the information of said memory to supply normally to said amplifying means sequences of binary signals corresponding to said points, settable means for defining a point of mutual intersection of a pair of orthogonal axes, marker generating means controlled by said settable means to supply normally to said first amplifying circuit signals corresponding to said pair of orthogonal axes, timing means for simultaneously timing said reading means and said marker generating means, and brightening means responsive to the simultaneous supplying of a signal by said reading means and said marker generating means for additionally supplying a signal to said second amplifying circuit for correspondingly increasing the display brightness.

5. A visual display unit according to claim 9, in which all the points on the screen are scanned in sequence, characterized in that the timing means includes a memory storing command words, and means for addressing sequentially the memory in order to generate synchronising signals for the scanned sequence of points.

6. A visual display unit according to claim 4, wherein said settable means comprise a keyboard operable for variably setting said point of intersection.

7. A visual display unit according to claim 4, comprising a counter for addressing said memory, a processor for causing said memory to be recorded with said information and means for alternatively enabling the processor and for causing said reading means to access the memory in order to read or write information relating to the image.

8. A visual display according to claim 4, including inhibiting means settable for inhibiting said marker generating means in correspondence with a predetermined region of said screen.

9. A visual display according to claim 8, including an auxiliary memory conditionable by said brightening means for recording numerical positional information to be displayed in said predetermined region.

* * * * *